US012270223B2

(12) United States Patent
Yu et al.

(10) Patent No.: US 12,270,223 B2
(45) Date of Patent: Apr. 8, 2025

(54) UNDERWATER DEBRIS SUCTION APPARATUS

(71) Applicant: WYBOTICS Co., LTD., Tianjin (CN)

(72) Inventors: Qian Yu, Tianjin (CN); Pu Cen, Tianjin (CN); Cuixiao Geng, Tianjin (CN); Liangliang Xu, Tianjin (CN)

(73) Assignee: WYBOTICS Co., LTD., Tianjin (CN)

( * ) Notice: Subject to any disclaimer, the term of this patent is extended or adjusted under 35 U.S.C. 154(b) by 674 days.

(21) Appl. No.: 17/606,068

(22) PCT Filed: Jun. 26, 2020

(86) PCT No.: PCT/CN2020/098328
§ 371 (c)(1),
(2) Date: Oct. 25, 2021

(87) PCT Pub. No.: WO2020/228843
PCT Pub. Date: Nov. 19, 2020

(65) Prior Publication Data
US 2022/0195745 A1    Jun. 23, 2022

(30) Foreign Application Priority Data
May 12, 2019 (CN) .......................... 201910391321.1

(51) Int. Cl.
*E04H 4/16* (2006.01)
*B01D 35/02* (2006.01)
(Continued)

(52) U.S. Cl.
CPC .......... *E04H 4/1636* (2013.01); *B01D 35/02* (2013.01); *B01D 35/30* (2013.01); *C02F 1/001* (2013.01);
(Continued)

(58) Field of Classification Search
CPC ...... E04H 4/1636; B01D 35/02; B01D 35/30; B01D 2201/204; B01D 29/52; C02F 1/001; C02F 2103/42; C02F 2301/063
See application file for complete search history.

(56) References Cited

U.S. PATENT DOCUMENTS

| 2003/0101523 A1* | 6/2003 | Lepley, Jr. ............ E04H 4/1636 15/1.7 |
| 2004/0079690 A1 | 4/2004 | Erlich et al. |

(Continued)

FOREIGN PATENT DOCUMENTS

| CN | 1732320 A | 2/2006 |
| CN | 104018704 A | 9/2014 |

(Continued)

*Primary Examiner* — Bradley R Spies
*Assistant Examiner* — Jeannie McDermott
(74) *Attorney, Agent, or Firm* — Bayramoglu Law Offices LLC

(57) ABSTRACT

An underwater debris suction apparatus includes a power device and a filter device. The power device includes a suction component and a power drive device configured to provide power for the suction component. The underwater debris suction apparatus further includes a collection device, and the upper end of the collection device is provided with an opening. The suction component is at least partially located above the filter device or is entirely located in the space of the filter device. During operation of the suction component, unfiltered pool water enters the filter device through a water inlet channel and flows to the side wall of the filter device, so that the filtered water is discharged from the side wall of the filter device, and the debris that cannot be discharged from the side wall of the filter device falls into the collection device.

20 Claims, 9 Drawing Sheets

(51) Int. Cl.
*B01D 35/30* (2006.01)
*C02F 1/00* (2023.01)
*C02F 103/42* (2006.01)

(52) U.S. Cl.
CPC .... *B01D 2201/204* (2013.01); *C02F 2103/42* (2013.01); *C02F 2301/063* (2013.01)

(56) References Cited

U.S. PATENT DOCUMENTS

| | | | |
|---|---|---|---|
| 2007/0007192 A1* | 1/2007 | Reid | E04H 4/1636 |
| | | | 210/269 |
| 2015/0337555 A1* | 11/2015 | Hui | E04H 4/1618 |
| | | | 210/808 |
| 2016/0032604 A1* | 2/2016 | Chen | E04H 4/1636 |
| | | | 210/167.16 |
| 2016/0051913 A1 | 2/2016 | Witelson et al. | |

FOREIGN PATENT DOCUMENTS

| | | | | |
|---|---|---|---|---|
| CN | 105113818 | A | 12/2015 | |
| CN | 105401754 | A | 3/2016 | |
| CN | 205235521 | U | 5/2016 | |
| CN | 105113818 | B * | 11/2017 | |
| CN | 208009513 | U | 10/2018 | |
| CN | 208009517 | U | 10/2018 | |
| CN | 109138540 | A * | 1/2019 | E04H 4/16 |
| CN | 110005231 | A | 7/2019 | |
| CN | 210768005 | U | 6/2020 | |
| WO | 9734681 | A1 | 9/1997 | |

* cited by examiner

UNDERWATER DEBRIS SUCTION APPARATUS

CROSS REFERENCE TO THE RELATED APPLICATIONS

This application is the national phase entry of International Application No. PCT/CN2020/098328, filed on Jun. 26, 2020, which is based upon and claims priority to Chinese Patent Application No. 201910391321.1, filed on May 12, 2019, the entire contents of which are incorporated herein by reference.

TECHNICAL FIELD

The present invention relates to an underwater cleaning apparatus, and in particular to an underwater debris suction apparatus.

BACKGROUND

A large amount of dirt and debris such as human hair, leaves and mud are left in a pool after long-term use and thus need to be cleaned occasionally using underwater cleaning apparatus. An underwater debris suction apparatus generally includes a filter device and an impeller. The impeller rotates so that the pool water enters the filter device and is then filtered by the filter device to discharge clean water while retaining the dirt and debris in the suction apparatus, thereby cleaning the pool.

Currently, there are various underwater debris suction apparatus available on the market. Some of them are provided with a filter device that is arranged behind the annular impeller. When cleaning, the impeller operates to pump the pool water into the internal passage in the middle of the annular impeller. The water then enters the filter device for subsequent filtering. In such an arrangement, since the pool water must pass through the internal passage in the middle of the annular impeller, the dirt and debris in the pool water can easily accumulate at the impeller, which not only affects the normal operation of the suction apparatus, but also seriously damages the impeller, thereby reducing the service life of the impeller and the suction apparatus.

Additionally, in some debris suction apparatus, the lower end of the collection device is provided with a suction port, and the filter device includes a filter between the impeller and the suction port, so that the pool water will first be filtered through the filter after entering the debris suction apparatus through the suction port. The pool water flows through the filter and then the filtered water is discharged. This arrangement solves the above-mentioned problem that the dirt and debris can easily accumulate at the impeller, but there exists another problem, that is, large debris in the water, such as leaves, may be attached to the filter directly under the impeller due to the suction action, which greatly reduces the suction force applied by the impeller on the pool water, thereby dramatically lowering the cleaning efficiency.

SUMMARY

An objective of the present invention is to provide an underwater debris suction apparatus with long service life and high cleaning efficiency.

In order to achieve the above-mentioned objective, the present invention adopts the following technical solutions.

An underwater debris suction apparatus includes a power device and a filter device. The power device includes a suction component and a power drive device configured to provide power for the suction component. The underwater debris suction apparatus further includes a collection device, and the upper end of the collection device is provided with an opening. The suction component is at least partially located above the filter device or is entirely located in the space of the filter device. During operation of the suction component, unfiltered pool water enters the filter device through a water inlet channel and flows to a side wall of the filter device, so that the filtered water is discharged from the side wall of the filter device, and the debris that cannot be discharged from the side wall of the filter device falls into the collection device.

The water inlet channel is arranged on the collection device or the filter device or is arranged between the collection device and the filter device. An inlet of the water inlet channel communicates with the pool water, and an outlet of the water inlet channel is located below the suction component. The unfiltered pool water enters the filter device under the action of the suction component, and then at least partially contacts the suction component. Preferably, the outlet of the water inlet channel is flush with the lower end of the filter device or is located in the filter device.

The lower end of the filter device is connected to the collection device, and the lower end of the filter device is provided with an opening.

The filter device includes a filter housing. The lower end of the filter housing is provided with an opening, and a side wall of the filter housing is provided with filter holes for filtering the unfiltered pool water. Alternatively, the filter device includes a filter housing and a filter connected to the side wall of the filter housing. The lower end of the filter housing is provided with an opening. The lower end of the filter is also provided with an opening. The side wall of the filter housing is provided with water passing holes. The lower end of the filter housing is connected to the collection device. Preferably, the lower end of the filter housing and the collection device are detachably connected or fixedly connected or integrally formed.

The filter device includes a filter housing, a filter frame, and a filter connected to a side wall of the filter frame. The lower end of each of the filter housing, the filter frame and the filter is provided with an opening. A side wall of the filter housing is provided with water passing holes. The side wall of the filter frame is provided with a filter gap. The filter frame is at least partially located in the filter housing.

The filter frame is detachably connected to the filter housing or is detachably connected to the collection device, and the lower end of the filter housing is connected to the collection device. Preferably, the lower end of the filter housing and the collection device are detachably connected or fixedly connected or integrally formed.

The power device further includes a power positioning member. The suction component is connected to the power positioning member and can rotate relative to the power positioning member. The power positioning member is connected to the filter device and/or the collection device.

The power positioning member is connected to the upper side of the filter device. Alternatively, the lower side of the collection device is provided with a water inlet pipe, and the water inlet pipe serves as the water inlet channel. The inlet of the water inlet pipe communicates with the pool water, and the outlet of the water inlet channel extends into the collection device. The power positioning member is connected inside the water inlet pipe. A gap is formed between the inner wall of the water inlet pipe and the power positioning member.

The power positioning member includes an upper cover and a lower cover connected to each other. The upper cover and the lower cover jointly form a receiving space. A sealing element is arranged between the lower end of the upper cover and the lower cover. The power drive device is arranged in the receiving space. A power output shaft of the power drive device extends out of the receiving space and is connected to the suction component.

The bottom of the collection device is provided with a drain port, and a filter is arranged at a position corresponding to the drain port.

In the present invention, during the operation of the suction component, the unfiltered pool water enters the filter device through the water inlet channel and flows to the side wall of the filter device to be filtered by the filter device. The filtered water is discharged from the side wall of the filter device, and the debris that cannot be discharged from the side wall of the filter device falls into the lower part of the collection device due to gravity. In this arrangement, there is no internal passage for the unfiltered pool water to pass through in the middle of the suction component, so that the dirt and debris in the pool water will not clog the suction component, thereby ensuring the normal operation of the debris suction apparatus, and also won't reduce its service life because of damaging the suction component. In this way, the service life of the debris suction apparatus is greatly improved. Moreover, since the lower end of the filter device is provided with an opening, and the impeller is arranged in the filter device and contacts the unfiltered pool water, the impeller is not arranged outside the filter and doesn't directly face the filter, which avoids the situation where large debris such as leaves occludes the filter to reduce the suction force of the impeller, and greatly improves the cleaning efficiency.

DETAILED DESCRIPTION OF THE EMBODIMENTS

Embodiment 1

Figure 1:
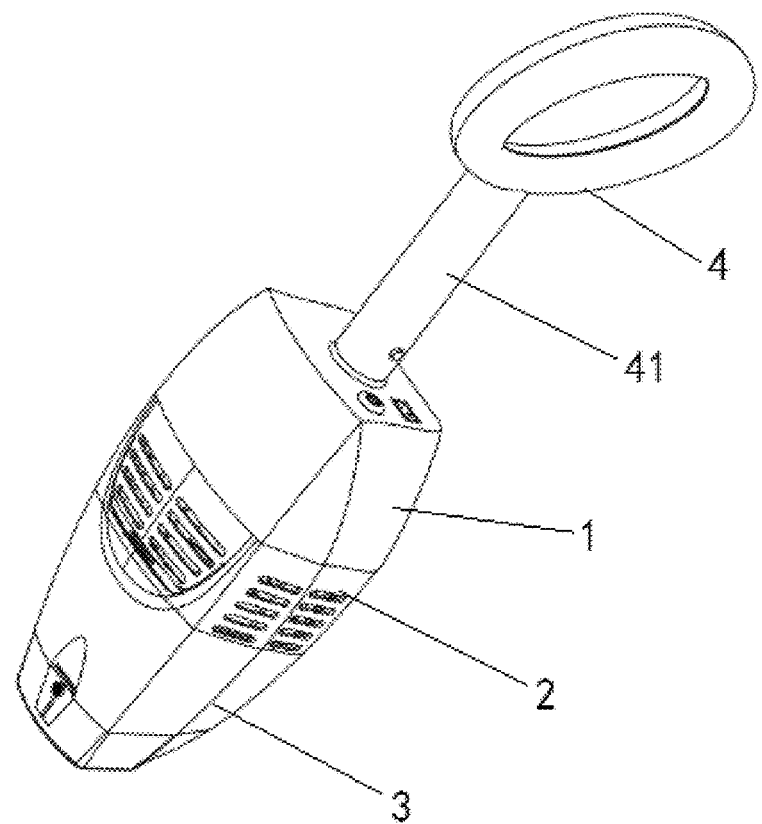
FIG. 1 is a perspective view of an underwater debris suction apparatus according to Embodiment 1 of the present invention.

As shown in FIGS. 1-7, in the present embodiment, the underwater debris suction apparatus includes the power device 1 and the filter device 2. The power device 1 includes the suction component 11 and the power drive device 13 configured to provide power for the suction component. The underwater debris suction apparatus further includes the collection device 3. The upper end of the collection device 3 is provided with an opening. The suction component 11 is at least partially located above the filter device 2 or is entirely located in the space of the filter device 2. During operation of the suction component 11, water enters the filter device 2 through a water inlet channel and flows to the side wall of the filter device 2, so that the filtered water is discharged from the side wall of the filter device 2, and the debris that cannot be discharged from the side wall of the filter device 2 falls into the collection device 3.

The water inlet channel is arranged on the filter device 2 or the collection device 3 or is arranged between the collection device and the filter device. The inlet of the water inlet channel communicates with the pool water, and the outlet of the water inlet channel is located below the suction component. The unfiltered pool water enters the filter device and then at least partially contacts the suction component. Preferably, the outlet of the water inlet channel is flush with the lower end of the filter device or is located in the filter device. In the present embodiment, the water inlet pipe 31 is provided on the lower side of the collection device 3. The lower end of the water inlet pipe 31 communicates with the pool water. The upper end of the water inlet pipe 31 extends into the collection device 3 and is located below the suction component 11. The water inlet pipe 31 serves as the water inlet channel. The substance (dirt) remaining after filtration falls into the space between the side wall of the collection device 3 and the water inlet pipe 31 due to gravity. The outlet of the water inlet channel is flush with the lower end of the filter device or is located in the filter device. In other words, the upper end of the water inlet pipe (i.e., the position of the outlet) is flush with the upper end of the collection device or higher than the upper end of the collection device. This arrangement of the water inlet pipe 31 has the following advantages. On one hand, the pumped water directly enters the filter device 2 and is then discharged after being filtered by the filter device 2, thereby reducing the burden of the suction component 11, and improving the overall cleaning efficiency. On the other hand, during the operation of the debris suction apparatus, the outside water flows upward through the water inlet pipe 31 into the filter device 2, and the debris (i.e., the substance remaining after filtration) that has fallen into the lower side of the collection device 3 due to gravity cannot move down through the water inlet pipe 31 even when the water moves upward and thus cannot enter the pool again. After the debris suction apparatus is stopped, the debris that has fallen into the lower side of the collection device 3 due to gravity is deeply impossible to move upward by itself. In this way, the debris collected after the filtration of the filter device 2 is completely prevented from entering the pool again, thereby greatly improving the cleaning efficiency.

In other embodiments, the upper end of the water inlet pipe 31 may also be located under the lower side of the filter device 2.

The water inlet pipe 31 extends up and down. Specifically, the lower end of the water inlet pipe 31 is flush with the bottom wall of the collection device 3 or extends downward outside the collection device 3. The lower end of the water inlet pipe 31 extends outside the lower end of the collection device 3. The cross section of the water inlet pipe 31 is smaller than the cross section of the collection device 3, such that the debris suction apparatus can also be applied to narrow corners, and thus can clean the pool more thoroughly.

Preferably, the water inlet pipe 31 and the collection device 3 are integrally formed. Optionally, the water inlet pipe 31 is fixedly or detachably connected to the collection device 3 by other means.

In other embodiments, the water inlet channel can also be configured as a hose. The collection device 3 or the filter device 2 is provided with a through hole. One end of the hose enters the filter device 2 through the through hole, and the other end of the hose is located outside the collection device 3 or the filter device 2. Alternatively, the collection device 3 is provided with an upper through hole, and the filter device 2 is correspondingly provided with a lower through hole, so that after the filter device is connected to the collection device, the upper through hole and the lower through hole jointly form a through hole for the hose to pass therethrough.

In other embodiments (not shown), the middle of the bottom wall of the collection device 3 is provided with a through hole, and the through hole serves as the water inlet channel. Preferably, a cover plate is pivotally connected to the upper end surface of the bottom wall of the collection device 3. The cover plate rotates downward to cover the through hole. When water flows into the collection device 3 through the through hole, the cover plate is pushed to open. When no water flows into the collection device 3 through the through hole, the cover plate rotates downward due to gravity to occlude the through hole, which prevents the substance in the collection device 3 remaining after the filtration from flowing through the through hole.

Preferably, the suction component 11 is arranged on the upper side of the inside of the filter device 2 and is located directly above the outlet of the water inlet channel. In this arrangement, the suction component 11 is close to the water inlet channel and thus produces a large suction force on the water, so that the water can enter the filter device 2 through the water inlet channel more quickly and easily. Moreover, the water flows a short distance to the side wall of the filter device 2 when the water entering the filter device 2 is subject to a centrifugal force generated by the suction component 11 and thus the water suffers less resistance and can flow to the side wall of the filter device 2 more quickly to be filtered, which greatly improves the filtering speed and the cleaning efficiency.

The lower end of the filter device 2 is connected to the collection device 3, and the lower end of the filter device 3 is provided with an opening. The power device 1 is connected to the filter device 2 and/or the collection device 3.

In the present embodiment, the filter device 2 includes the filter housing 21, the filter frame 22, and a filter (not shown) connected to the side wall of the filter frame. The lower end of each of the filter housing 21, the filter frame 22 and the filter is provided with an opening. A side wall of the filter housing is provided with the water passing holes 211. The side wall of the filter frame is provided with the filter gap 220. The filter frame is at least partially located in the filter housing 21.

Preferably, the filter frame 22 is detachably connected to the filter housing 21, so that after the collection device 3 is detached from the filter housing 21, the filter frame 22 can be detached from the filter housing 21 to facilitate cleaning. An elastic hook is provided on the filter frame 22, and the filter housing 21 is provided with an engaging hole. The elastic hook is engaged into the engaging hole, so that the filter housing 21 and the filter frame 22 are connected. When the filter housing 21 and the filter frame 22 need to be detached, the elastic hook is pressed inward to be disengaged from the engaging hole. Alternatively, the elastic hook is directly engaged into a certain water passing hole.

In the present embodiment, the suction component 11 is entirely located in the filter frame 22.

In the present embodiment, the filter frame 22 includes the lower frame 221, the upper top plate 222, and the connecting member 223 connecting the lower frame 221 to the upper top plate 222. The lower frame 221 has a frame structure with an opening. The connecting member 223 is configured as a plurality of spaced connecting ribs, and the filter gap 220 is formed between two adjacent connecting ribs. Alternatively, the connecting member 223 is configured as a whole plate, and the whole plate is provided with holes that serve as the filter gaps 220. In other embodiments, the filter frame 22 can also be configured as other functionally suitable structures.

In the present embodiment, the lower end of the filter housing 21 is detachably connected to the upper end of the collection device 3. The collection device 3 is provided with the elastic finger 32 or an engaging hole. Correspondingly, the lower end of the filter housing 21 is provided with the engaging hole 210 or an elastic finger, and the elastic finger 32 is engaged into the engaging hole 210, so that the filter housing 21 is connected to the collection device 3. When the filter housing 21 and the collection device 3 need to be detached, under the deforming force of the elastic finger 32, the elastic finger 32 is disengaged from the engaging hole 210. In this way, the detachable connection between the filter housing 21 and the collection device 3 is realized.

In the present embodiment, the power device 1 further includes the power positioning member 12. The suction component 11 is connected to the power positioning member 12. The suction component 11 can rotate relative to the power positioning member 12. The filter device 2 is connected to the power positioning member 12 or/and the collection device 3. In the present embodiment, the power positioning member 12 is connected above the filter housing 2. In this arrangement, after the collection device 3 is detached from the filter housing 21, the filter housing 21 and the power positioning member 12 remain connected, so that the suction component 11 is still located in the filter housing 21. In this way, the suction component 11 is prevented from being exposed to the outside to avoid damage. The power positioning member 12 can be fixedly connected to the filter housing by means of integral forming or screws, and can also be detachably connected to facilitate maintenance.

The upper end of the filter housing 21 of the filter device 2 is connected to the power positioning member 12. The lower end of the filter housing 21 is detachably connected to the collection device 3. The filter frame 22 can be detachably connected to the filter housing 21, and can also be detachably connected to the collection device 3. In this way, the filter frame 22 and the collection device 3 can be together detached from the filter housing 21, and then the filter frame 22 (including the filter thereon) can be detached from the collection device 3 for cleaning. After being cleaned, the filter frame 22, the collection device 3 and the filter housing 21 are re-assembled in reverse order. In this arrangement, the suction apparatus is cleaned easily and prevents the debris in a collection box from flowing out and causing secondary contamination. The upper end of the filter housing 21 can be integrated with the lower end of the power positioning member 12. Optionally, the filter housing 21 and the power positioning member 12 can also be fixedly connected or detachably connected by other means.

The power positioning member 12 includes the upper cover 121 and the lower cover 122 connected to each other. The upper cover 121 and the lower cover 122 jointly form a receiving space. A sealing element is provided between the lower end of the upper cover 121 and the lower cover 122. The power drive device 13 is fixedly connected in the receiving space. The power output shaft of the power drive device 13 extends downward outside the power positioning member 12 and extends into the filter frame 22 of the filter device to be connected to the suction component 11. Preferably, the upper top plate 222 of the filter frame is provided with the through hole 225 for the power output shaft of the power drive device 13 to pass therethrough.

In the present embodiment, the suction component 11 is configured as a centrifugal impeller, preferably a semi-open centrifugal impeller. The power drive device 13 is configured as an electric motor. Preferably, the central axis of the output shaft of the electric motor and the central axis of the water inlet pipe 31 are coaxial, that is, the outlet of the water inlet pipe 31 is located directly under the centrifugal impeller. In this arrangement, when driven by the electric motor to rotate, the centrifugal impeller produces a greater suction force on the pool water, thereby improving the cleaning efficiency.

The power device 1 further includes the battery 14, the circuit board 15, and the switch button 16 arranged in the receiving space. The battery 14, the switch button 16 and the electric motor are all electrically connected to the circuit board 15. One end of the switch button 16 extends out of the power positioning member 12. The switch button 16 is pressed to turn on or off the underwater debris suction apparatus.

In the present embodiment, the power positioning member 12 further includes the housing 123 with an opening facing downward. The housing 123 fixedly covers the upper cover 121. The housing 123 is fixedly connected to the upper cover 121 and/or the lower cover 122 by screws or other fastening means.

When the switch button 16 is pressed, the battery 14 supplies power to the electric motor, and the electric motor works to drive the centrifugal impeller to rotate. When the centrifugal impeller rotates, a negative pressure is generated below the impeller, and the unfiltered pool water is pumped into the water inlet pipe 31 due to the negative pressure and enters the filter device 2. Then, the unfiltered pool water flows to the outside of the centrifugal impeller under the action of the centrifugal force generated by the rotation of the centrifugal impeller, that is, the unfiltered pool water flows to the outside of the upper end of the inlet pipe 31, that is, the side wall of the filter device 2. In this way, the water will be discharged only after passing through and being filtered by the filter device 2. The debris that cannot pass through the side wall of the filter device 2, that is, the debris remaining after the filtration, falls into the collection device 3 due to gravity. Specifically, the unfiltered pool water, when flowing to the outside of the upper end of the water inlet pipe 31, is filtered by the filter device. The filtered water flows into the pool after passing through the water passing holes 211 of the filter housing 21, while the debris in the water cannot pass through the filter device and thus falls into the lower part of the collection device 3 due to gravity. Such actions are repeated until the pool water is cleaned up or the collection device 3 has accumulated an excessive amount of debris that needs to be cleaned.

In this way, the unfiltered pool water, after flowing from the upper end of the water inlet pipe 31, is agitated by the semi-open centrifugal impeller. The water around the impeller also flows under the agitation of the impeller, and flows outward under the action of the centrifugal force generated by the rotation of the semi-open centrifugal impeller. The debris mixed in the water is also thrown outward along with the water flow. In this way, the centrifugal impeller does not need an internal passage for the unfiltered pool water to pass through. Therefore, the debris in the pool water will not clog or block the suction component 11, which will not affect the normal operation of the suction apparatus. The suction apparatus has a simple and reliable structure, thereby greatly improving its efficiency and service life. In addition, since the lower end of the filter device 2 is provided with an opening, and the impeller is arranged in the filter device and contacts the unfiltered pool water, the impeller is not arranged outside the filter and doesn't directly face the filter, thereby avoiding the situation where large debris such as leaves occludes the filter to reduce the suction force of the impeller. In this way, the cleaning efficiency is greatly improved.

In other embodiments, a remote controller is employed for remote control, instead of arranging the switch button 16. Optionally, instead of arranging the battery 14, the power drive device and an external power supply are directly connected through a wire, or indirectly connected through the circuit board 15 and a wire.

In other embodiments, the power drive device 13, the battery 14, the circuit board 15, and the switch button 16 are arranged outside the power positioning member 12 of the debris suction apparatus, rather than inside the power positioning member 12. The power output shaft of the power drive device 13 is connected to the suction component 11 through a flexible shaft, and the power positioning member 12 is only used to position the suction component 11. In other words, the suction component can be connected to the power positioning member 12 through a mounting shaft, and the mounting shaft is rotatably connected to the power positioning member 12 by any known means such as bearing fit and hole-and-shaft clearance fit. The suction component is connected to the mounting shaft, and the power output shaft of the power drive device 13 is then connected to the mounting shaft through a flexible shaft.

In other embodiments (not shown), the upper side of the filter frame 22 extends outside the upper end of the filter housing 21, and the lower side of the filter frame 22 is located inside the upper side of the filter housing 21. The power positioning member 12 is arranged at the upper end of the filter frame 22 and connected to the filter frame 22. In this arrangement, after the pool water enters the filter device 2, a part of the water is filtered by the filter on the upper side wall of the filter frame 22 and is then directly discharged into the pool, and the other part of the water is filtered by the filter and is then discharged into the pool after passing through the water passing holes 211 of the filter housing 21. Alternatively, the lower side of the filter frame 22 is located in the upper side of the collection device 3, and the upper side of the filter frame 22 is located in the filter housing 21. Correspondingly, the upper side wall of the collection device 3 is also provided with the water passing holes 211. Alternatively, the power positioning member 12 extends downward to form an annular housing. The upper side of the filter frame 22 is located in the annular housing, and the lower side of the filter frame 22 is located in the filter housing 21. The annular housing is connected to the filter housing 21. Correspondingly, the side wall of the annular filter housing 21 is also provided with the water passing holes 211. In other words, the filter frame 22 is at least partially located in the filter housing 21.

In another embodiment (not shown), the filter device 2 includes a filter housing. The lower end of the filter housing is provided with an opening. The side wall of the filter housing is provided with filter holes for filtering the unfiltered pool water, so that when flowing to the side wall of the filter device, the unfiltered pool water is directly filtered through the filter holes of the filter housing.

Alternatively, the filter device 2 includes a filter housing and a filter connected to the side wall of the filter housing. The lower end of the filter housing is provided with an opening. The lower end of the filter is also provided with an opening. The side wall of the filter housing is provided with water passing holes, so that when flowing to the side wall of the filter device, the unfiltered pool water is filtered by the filter. The water passing holes are configured only for the water to pass therethrough. The filter can be connected to the inner side wall or the outer side wall of the filter housing 21 by any known and feasible means, for example, a hook is provided on the side wall of the filter housing 21 and hooks the filter. In this way, after entering the filter device 2, the pool water is filtered after passing through the filter, and the debris that cannot pass through the filter falls into the lower part of the collection device 3 due to gravity.

In the above embodiment, the water pumped by the suction component 11 directly flows to the side wall of the filter device 2 to be filtered. The power positioning member 12 may also extend downward to form an annular housing. The annular housing is connected to the upper end of the filter housing 21, and the annular housing is not provided with the water passing holes 211. The suction component 11 is located in the annular housing. In this arrangement, there is a certain distance between the suction component 11 and the upper end of the filter device 2, so that when the water flows to the side wall and contacts the annular housing, the water will flow downward, and then be filtered by the filter device 2.

The filter housing 21 is annular, and its lower end is provided with an opening. Alternatively, the filter housing 21 is inverted U-shaped, and its lower end is also provided with an opening. In addition, the top wall of the inverted U-shaped filter housing 21 is also provided with a through hole for the output shaft of the electric motor to pass therethrough. The filter housing 21 can also be configured in other suitable shapes, as long as its lower end is provided with an opening.

In summary, the lower end of the filter device 2 is provided with an opening. The unfiltered pool water enters the filter device 2 through the water inlet channel, and flows to the side wall of the filter device 2, so that the filtered water is discharged from the side wall of the filter device 2. The debris that cannot be discharged from the side wall of the filter device 2 passes downward through the opening at the lower end of the filter device 2 and then falls into the collection device 3.

The drain port 33 is provided at the bottom of the collection device 3, and a filter is provided at a position corresponding to the drain port 33. In this arrangement, after the debris suction apparatus is lifted from the water, the water in the collection device 3 will flow out through the filter, thereby reducing the overall weight. Moreover, the filter prevents the debris from flowing out, thereby improving the cleaning effect.

In the present embodiment, the collection device 3 is configured as a collection box. The upper end of the collection box is provided with an opening. The bottom wall of the collection box is provided with the drain port 33. The side wall of the collection box is provided with the insertion hole 34 corresponding to the position of the drain port 33. The frame 35 is inserted into the drain port 33 through the insertion hole 34, and the filter is assembled on the frame 35. In order to insert the frame 35 more conveniently and smoothly without misalignment, a guide groove is provided around the drain port 33 so that the frame 35 is inserted into the drain port 33 along the guide groove.

In other embodiments, the filter may also be directly connected to a position corresponding to the drain port 33 on the bottom wall of the collection box 3.

The underwater debris suction apparatus further includes the handle 4 with a lower end that is connected to the upper side of the power device 1 for an operator to hold by hand. Preferably, the handle 4 is connected to the upper end of the power positioning member 12.

Figure 2:
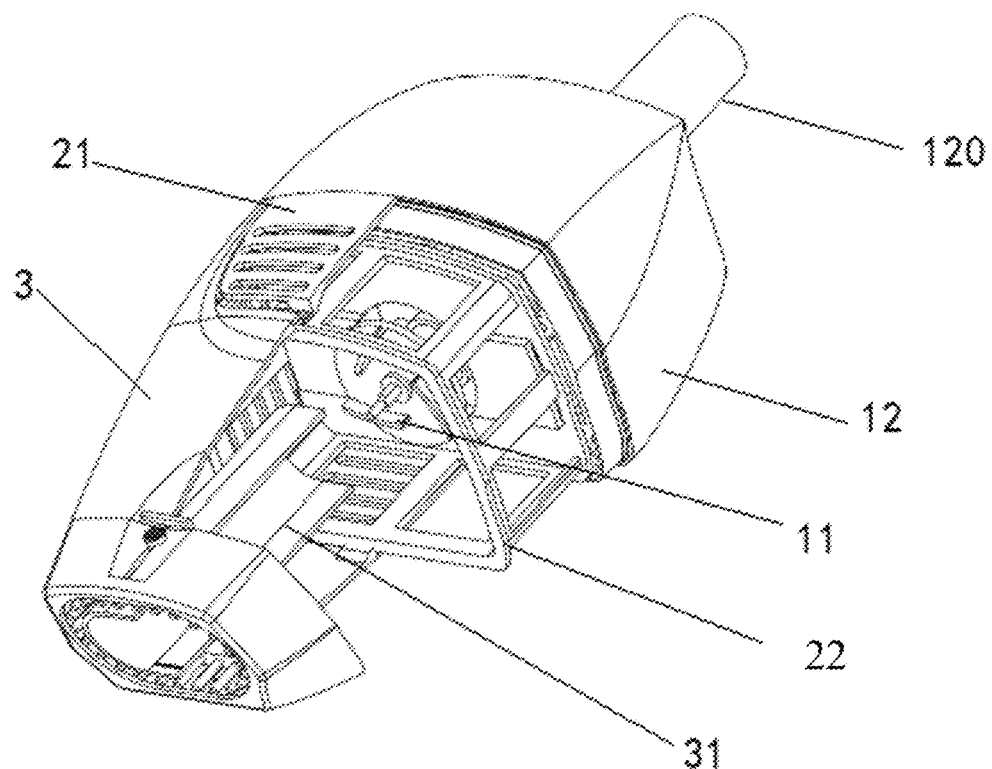
FIG. 2 is an enlarged perspective view of the internal structure of the underwater debris suction apparatus according to Embodiment 1 of the present invention.
Figure 3:
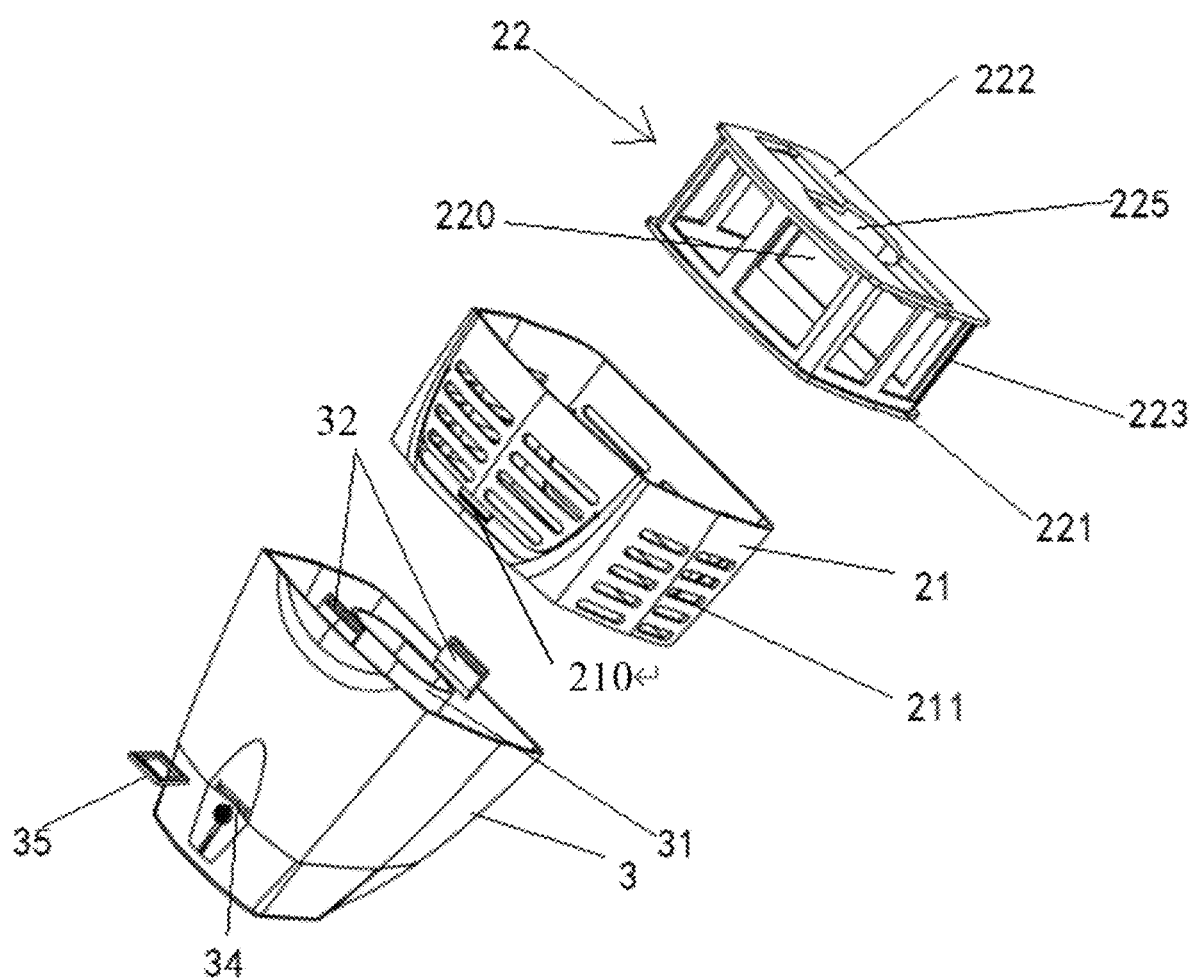
FIG. 3 is an exploded view of the collection device and the filter device of the underwater debris suction apparatus according to Embodiment 1 of the present invention.
Figure 4:
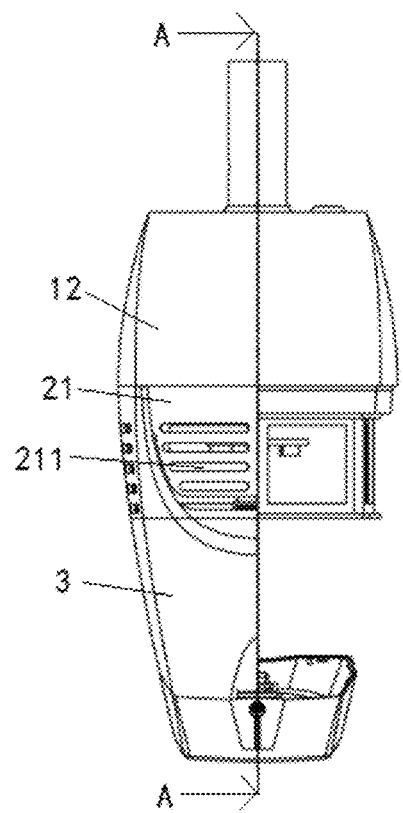
FIG. 4 is an enlarged elevational view of FIG. 2.
Figure 5:
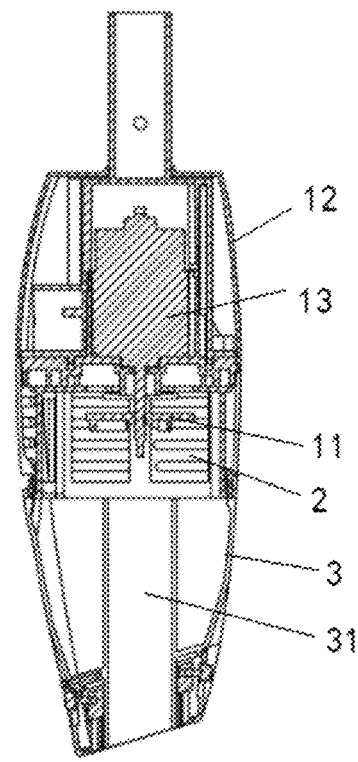
FIG. 5 is a cross-sectional enlarged view taken along arrow A-A in FIG. 4.
Figure 6:
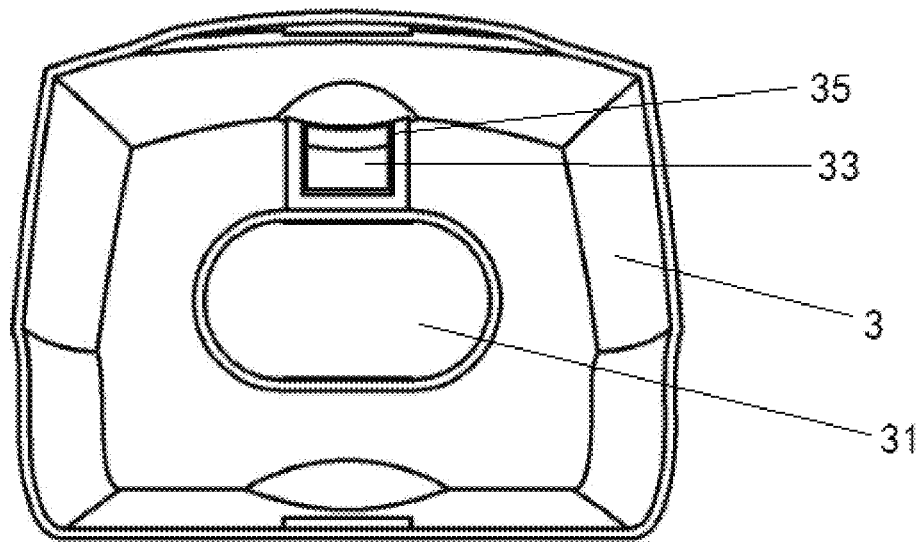
FIG. 6 is an enlarged top view of the collection device of the underwater debris suction apparatus according to Embodiment 1 of the present invention.
Figure 7:
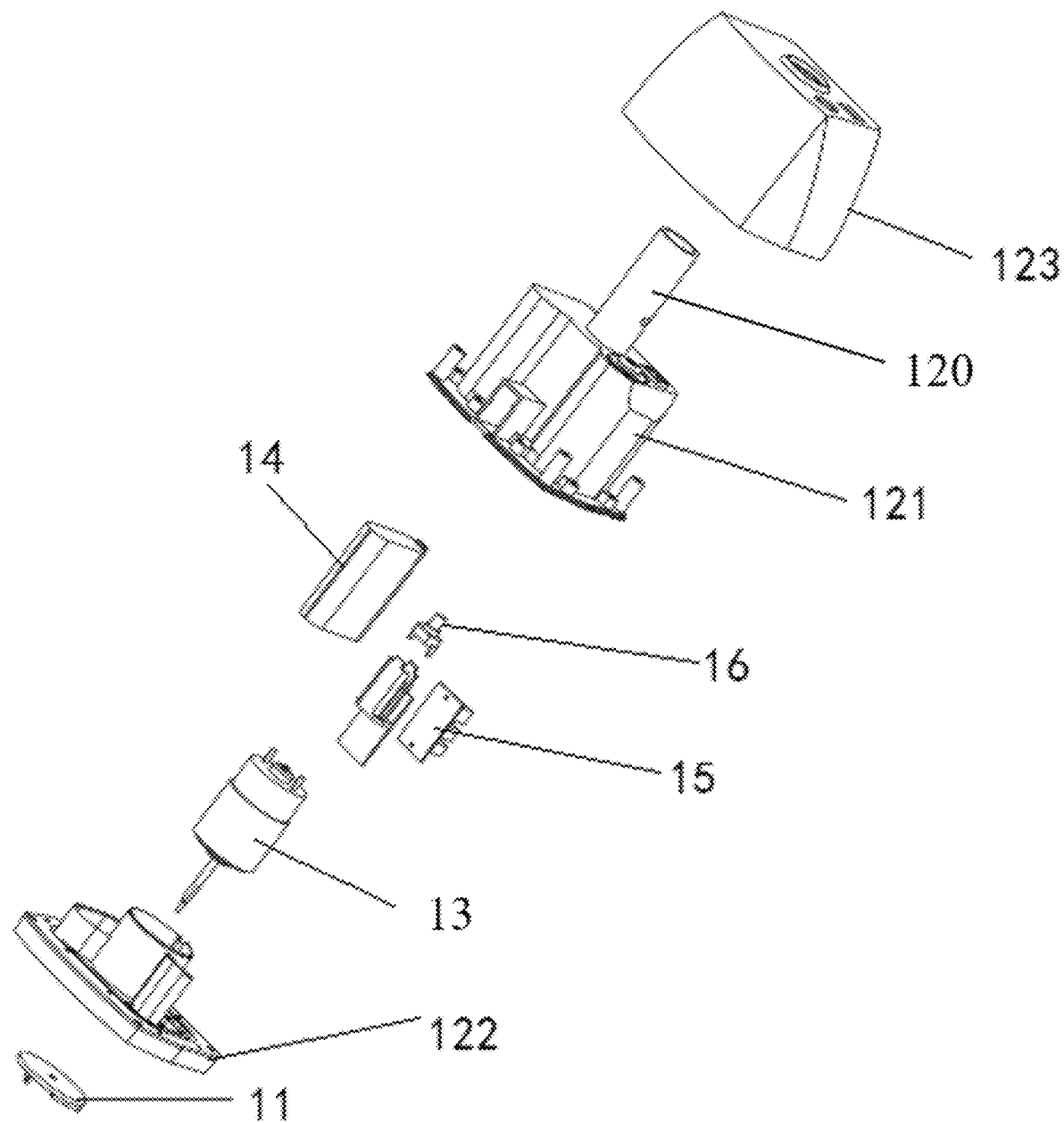
FIG. 7 is an exploded view of a power device of the underwater debris suction apparatus according to Embodiment 1 of the present invention.

In the present embodiment, the first connecting pipe 120 extends from the upper end of the power positioning member 12. The lower end of the handle 4 is provided with the second connecting pipe 41. The first connecting pipe 120 is sleeved outside the second connecting pipe 41 or the second connecting pipe 41 is sleeved outside the first connecting pipe 120. The first connecting pipe 120 is arranged at the upper end of the upper cover 121 (as shown in FIGS. 1, 2, and 7).

The top wall of the housing 123 is provided with a through hole. The first connecting pipe 120 passes upward through the through hole and is then connected to the second connecting pipe 41. In other embodiments, the first connecting pipe 120 is arranged at the upper end of the housing 123.

The lower end of the handle 4 can also be connected to the power positioning member 12 by other feasible means.

Embodiment 2

Figure 8:
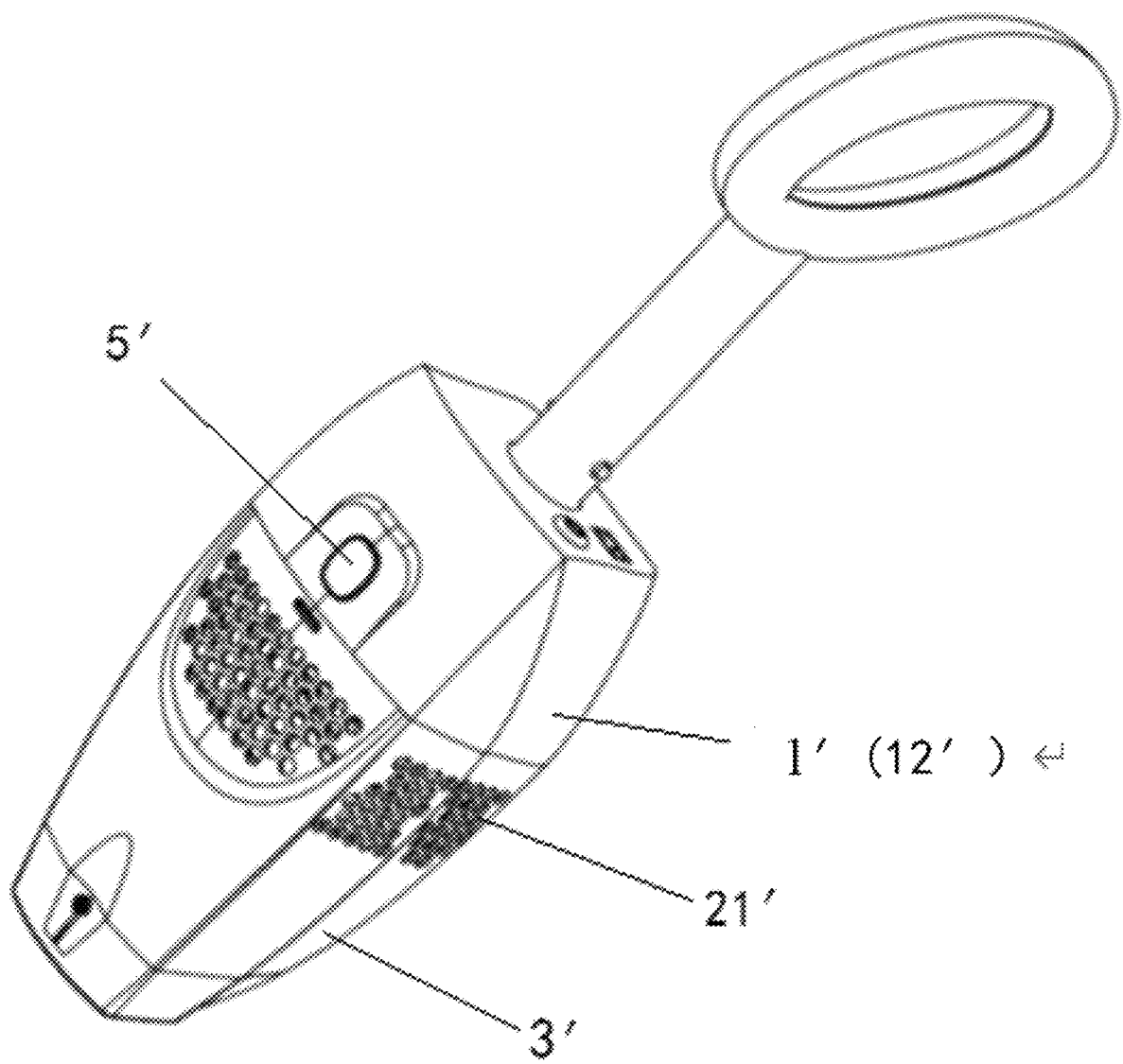
FIG. 8 is a perspective view of an underwater debris suction apparatus according to Embodiment 2 of the present invention.
Figure 9:
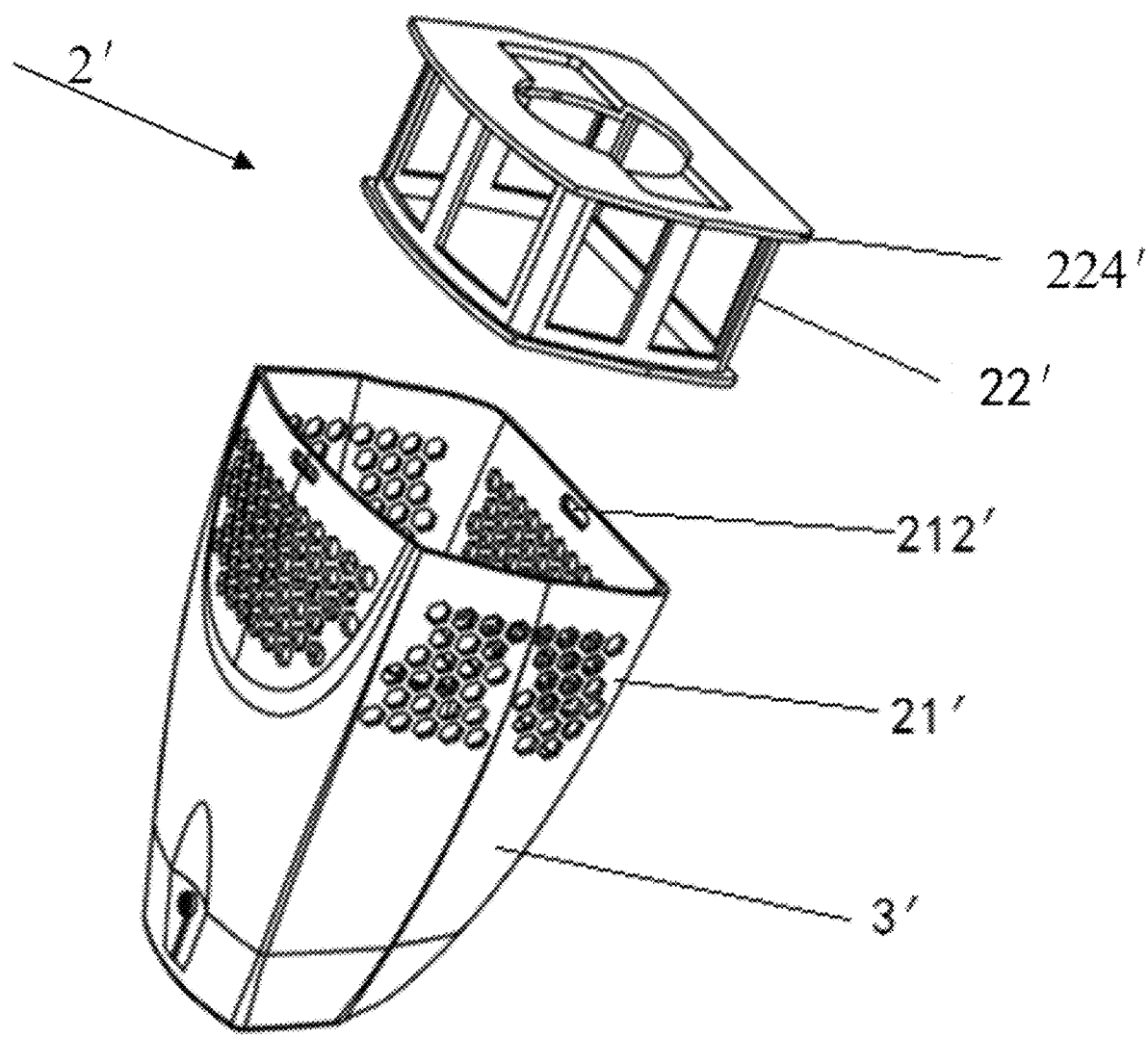
FIG. 9 is an enlarged exploded perspective view of the collection device and the filter device of the underwater debris suction apparatus according to Embodiment 2 of the present invention.
Figure 10:
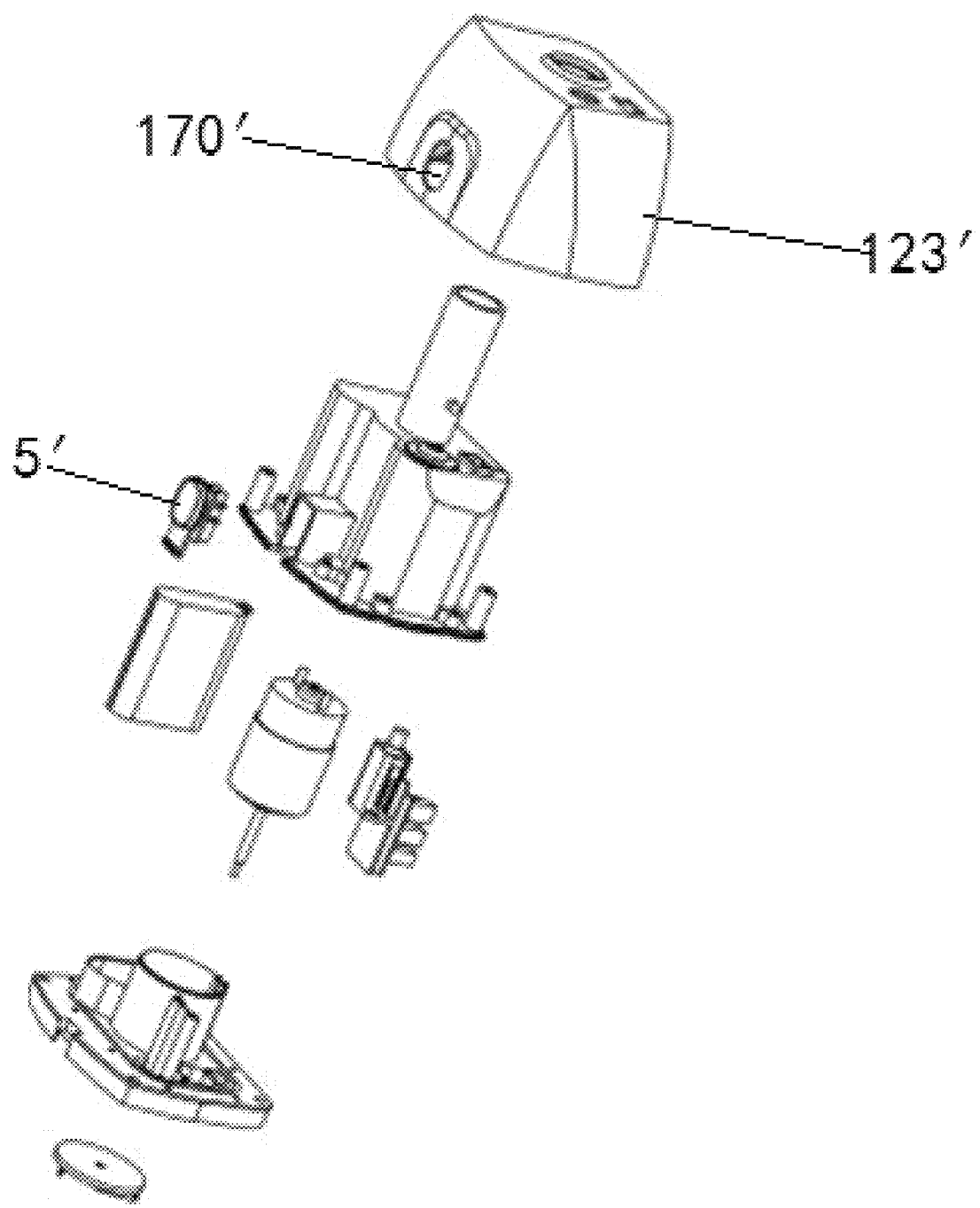
FIG. 10 is an exploded view of the power device of the underwater debris suction apparatus according to Embodiment 2 of the present invention.

As shown in FIGS. 8, 9, and 10, the difference between the present embodiment and the above embodiment is that the filter housing 21' is integrated with the upper end of the collection device 3', and the power positioning member 12' of the power device 1' is detachably connected to the filter housing 21'.

In the present embodiment, the first flange 224' extends outward from the periphery of the filter frame 22'. Correspondingly, a second flange (not shown) extends from the inner wall of the filter housing 21'. During assembly, the filter frame 22' is placed into the filter housing 21' until the first flange 224' abuts against the second flange so that the filter frame 22' and the filter housing 21' are connected and positioned relative to each other.

The first flange 224' may be integrated with the periphery of the upper end of the filter frame 22', or may be arranged on the periphery of the lower end of the filter frame 22' or arranged at other suitable and feasible positions.

The lower end of the power positioning member 12' abuts against the upper end of the filter frame 22', and then the power positioning member 12' is connected to the filter housing 21' by a detachable connecting device, so as to connect the collection device 3', the filter device 2' and the power positioning member 12'.

The detachable connecting device includes a positioning assembly and a detachable connecting assembly that are arranged at intervals. The positioning assembly includes a positioning hole formed on the side wall of the filter housing and a positioning protrusion (not shown) provided on the power positioning member. The detachable connecting assembly includes the engaging hole 212' formed on the side wall of the filter housing 21', the button 5' movably connected to the power positioning member 12', and a first spring (not shown) arranged between the button 5' and the power positioning member 12'. The button 5' includes a pressing portion and an elastic finger extending downward from the lower end of the pressing portion. The elastic finger extends into the filter housing 21', and the pressing portion is located outside the upper end of the filter housing 21'. During assembly, the positioning protrusion is first engaged into the positioning hole, so that the filter housing and the power positioning member are relatively positioned. Then, under the action of the first spring, the elastic finger at the lower end of the button 5' is engaged into the engaging hole 212' of the filter housing 21', so that the power positioning member 12' is connected to the filter housing 21'.

When the collection device 3' needs to be removed for cleaning, the button 5' is pressed to compress the first spring, so that the elastic finger is disengaged from the engaging hole of the filter housing 21'. Then, the positioning protrusion is separate from the positioning hole so that the power device 1' can be removed at this time. After that, the filter frame 22' is removed, so that the collection device 3', the filter frame 22' and the power device 1' are separated, thereby cleaning the collection device 3' and the filter device 2'.

The side wall of the housing 123' is provided with the anti-jamming hole 170' corresponding to the pressing portion of the button 5', so that the button 5' will not be jammed by the housing 123' when pressed.

In order to make the connection between the power positioning member 12' and the filter housing 21' more stable, a plurality of groups of detachable connecting devices can be arranged at intervals.

In other embodiments, the filter housing 21' may also be fixedly connected to the collection device by any other feasible known means.

Embodiment 3

Figure 11:
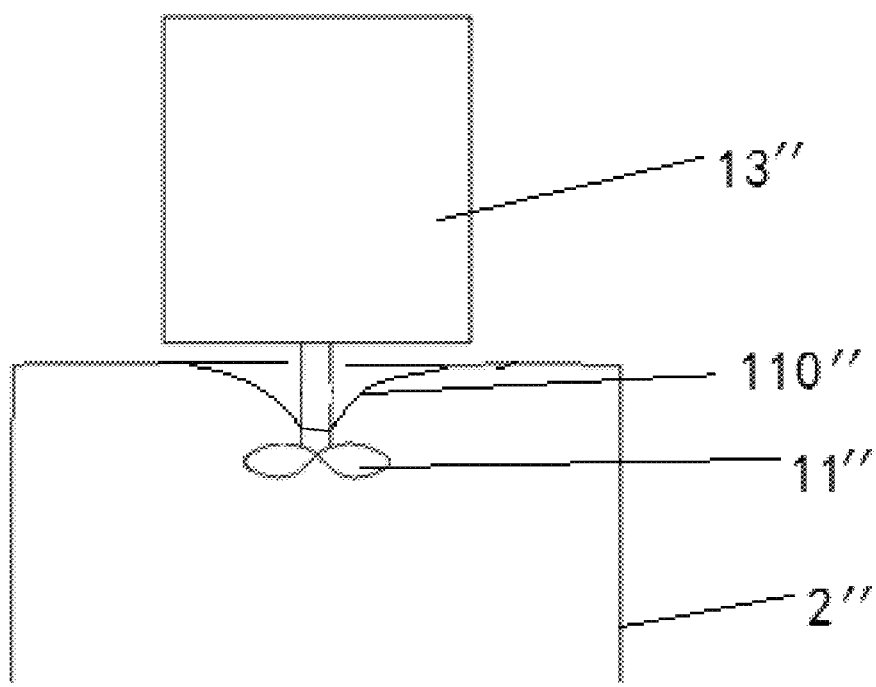
FIG. 11 is a partially enlarged view of an underwater debris suction apparatus according to Embodiment 3 of the present invention.

As shown in FIG. 11, the difference between the present embodiment and the above-mentioned embodiment is the arrangement of the suction component 11". In the present embodiment, the suction component 11" is configured as an axial flow pump impeller. The power output shaft of the power drive device 13" is further connected to the arc-shaped plate 110" with an opening facing downward, and the arc-shaped plate 110" is located above the axial flow pump impeller 11". In this arrangement, during the operation of the power drive device 13", water enters the filter device 2" through the water inlet channel and then moves farther upward. After passing through the gap between the blades of the axial flow pump impeller and contacting the arc-shaped plate 110", the water flows to the side wall of the filter device 2" to be filtered by the filter device 2".

The arc-shaped plate 110" can be integrated with the top wall of the filter device, or can be a separate part.

In this arrangement, the unfiltered pool water can be pushed to the side wall of the filter device 2" and the debris mixed in the water can be collected and placed in the collection device.

Embodiment 4

Figure 12:
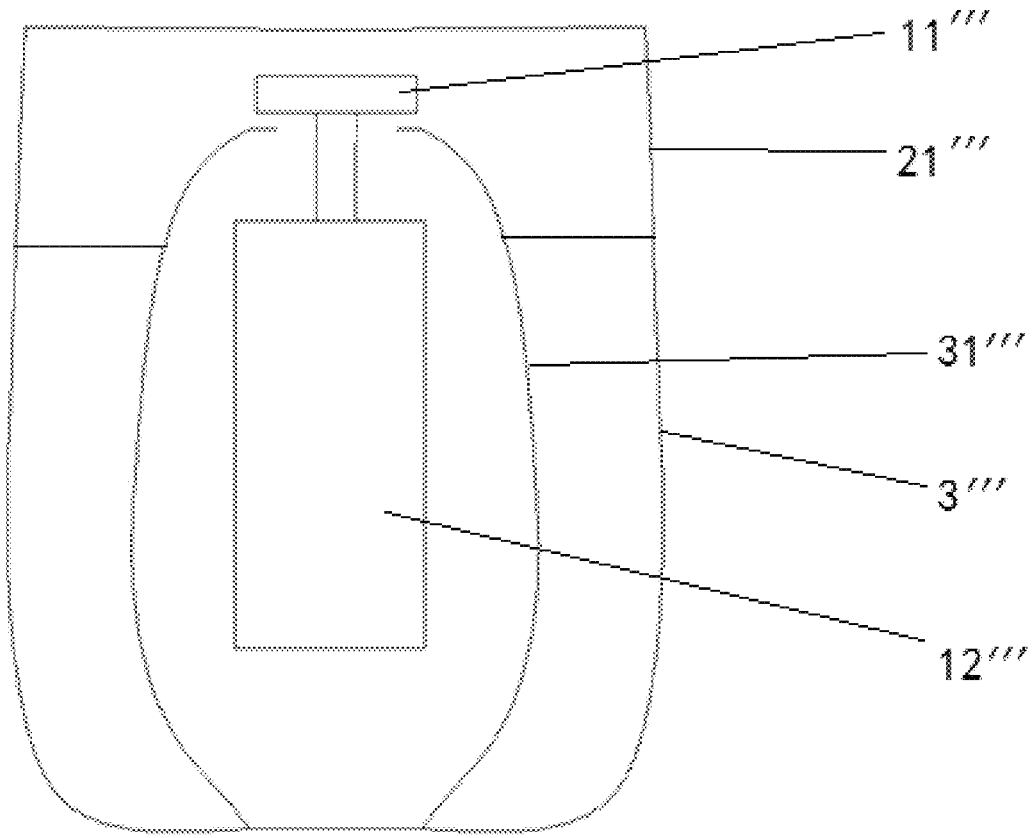
FIG. 12 is a schematic view of an underwater debris suction apparatus according to Embodiment 4 according to the present invention.

As shown in FIG. 12, in the present embodiment, the lower end of the filter housing 21''' of the filter device is detachably connected to the upper end of the collection device 3'''. The water inlet pipe 31''' is provided on the lower side of the collection device 3''', and the power positioning member 12''' is connected inside the water inlet pipe 31'''. In addition, a gap is formed between the power positioning member 12''' and the inner wall of the water inlet pipe 31''' to allow water to flow therethrough. The suction component 11''' is located above the water inlet pipe 31''' and in the space of the filter device 2'''.

If the power drive device is also arranged in the power positioning member 12''', the power output shaft of the power drive device extends upward out of the upper end of the water inlet pipe 31''' and is connected to the suction component 11'''.

The top wall of the filter housing 21''' is not provided with the water passing holes. The filter device is provided with a filter. The lower end of the filter is provided with an opening. The filter is annular, and the annular filter is sleeved on the outer side of the side wall of the filter housing 21''' or connected to the inner side wall of the filter housing 21'''. The filter device can also be inverted U-shaped, that is, the filter device includes an annular filter and an upper filter connected to the upper end of the annular filter. The inverted U-shaped filter covers the filter housing 21''', that is, the upper filter abuts against the top wall of the filter housing 21'''. The annular filter is located on the outer side wall of the filter housing 21'''. The inverted U-shaped filter can also be arranged in the filter housing 21''', that is, the annular filter is connected to the inner side wall of the filter housing 21''', and the upper filter is connected to the inner top wall of the filter housing 21'''.

Similarly, the filter device can also be configured as a filter frame with a filter as mentioned above, which will not be described in detail herein.

In this arrangement, during the operation of the suction component 11''', the water in the pool enters the filter device through the water inlet pipe 31''', and then flows to the side wall of the filter device, so that the filtered water is discharged from the side wall of the filter device, and the debris that cannot be discharged falls into the space between the inner wall of the collection device 3''' and the outer wall of the water inlet pipe 31'''.

What is claimed is:

1. An underwater debris suction apparatus, comprising a power device, a filter device, and
a collection device; wherein
the power device comprises a suction component and a power drive device configured to provide power for the suction component;
an upper end of the collection device is provided with a first opening;
the suction component is at least partially located above the filter device or the suction component is entirely located in a space of the filter device;
the suction component is configured as a semi-open centrifugal impeller, wherein after flowing from an upper end of a water inlet pipe, unfiltered pool water is agitated by the semi-open centrifugal impeller and flows outward under action of a centrifugal force generated by rotation of the semi-open centrifugal impeller;

during operation of the suction component, unfiltered pool water enters the filter device through a water inlet channel and flows to a side wall of the filter device, filtered water is discharged from the side wall of the filter device, and debris failing to be discharged from the side wall of the filter device falls into the collection device;

the lower end of the filter device is provided with an opening; and a side wall of the filter housing is provided with water passing holes.

2. The underwater debris suction apparatus according to claim 1, wherein the water inlet channel is arranged on the collection device or the filter device or the water inlet channel is arranged between the collection device and the filter device;

an inlet of the water inlet channel communicates with pool water, and an outlet of the water inlet channel is located below the suction component; and the unfiltered pool water enters the filter device under an action of the suction component, and then the unfiltered pool water at least partially contacts the suction component.

3. The underwater debris suction apparatus according to claim 1, wherein a lower end of the filter device is connected to the collection device, and the lower end of the filter device is provided with a second opening.

4. The underwater debris suction apparatus according to claim 3, wherein the filter device comprises a filter housing, wherein a lower end of the filter housing is provided with a third opening, and a side wall of the filter housing is provided with filter holes for filtering the unfiltered pool water; or the filter device comprises the filter housing and a second filter connected to the side wall of the filter housing, wherein the lower end of the filter housing is provided with the third opening, a lower end of the second filter is provided with a fourth opening; and the lower end of the filter housing is connected to the collection device.

5. The underwater debris suction apparatus according to claim 3, wherein the filter device comprises a filter housing, a filter frame, and a second filter connected to a side wall of the filter frame; wherein a lower end of the filter housing is provided with a third opening, a lower end of the second filter is provided with a fourth opening, and a lower end of the filter frame is provided with a fifth opening;

the side wall of the filter frame is provided with a filter gap; and the filter frame is at least partially located in the filter housing.

6. The underwater debris suction apparatus according to claim 5, wherein the filter frame is detachably connected to the filter housing or the filter frame is detachably connected to the collection device, and the lower end of the filter housing is connected to the collection device.

7. The underwater debris suction apparatus according to claim 1, wherein the power device further comprises a power positioning member;

the suction component is connected to the power positioning member and the suction component rotates relative to the power positioning member; and the power positioning member is connected to the filter device or/and the collection device.

8. The underwater debris suction apparatus according to claim 7, wherein the power positioning member is connected to an upper side of the filter device; or a lower side of the collection device is provided with a water inlet pipe, and the water inlet pipe serves as the water inlet channel; or an inlet of the water inlet pipe communicates with pool water, and an outlet of the water inlet channel extends into the collection device; or the power positioning member is connected inside the water inlet pipe, and a gap is formed between an inner wall of the water inlet pipe and the power positioning member.

9. The underwater debris suction apparatus according to claim 8, wherein the power positioning member comprises an upper cover and a lower cover connected to each other;

the upper cover and the lower cover jointly form a receiving space;

a sealing element is arranged between a lower end of the upper cover and the lower cover;

the power drive device is arranged in the receiving space;

a power output shaft of the power drive device extends out of the receiving space and the power output shaft of the power drive device is connected to the suction component.

10. The underwater debris suction apparatus according to claim 1, wherein a bottom of the collection device is provided with a drain port, and a filter is arranged at a position corresponding to the drain port.

11. The underwater debris suction apparatus according to claim 2, wherein a lower end of the filter device is connected to the collection device, and the lower end of the filter device is provided with a second opening.

12. The underwater debris suction apparatus according to claim 11, wherein the filter device comprises a filter housing, wherein a lower end of the filter housing is provided with a third opening, and a side wall of the filter housing is provided with filter holes for filtering the unfiltered pool water; or the filter device comprises the filter housing and a second filter connected to the side wall of the filter housing, wherein the lower end of the filter housing is provided with the third opening, a lower end of the second filter is provided with a fourth opening; and the lower end of the filter housing is connected to the collection device.

13. The underwater debris suction apparatus according to claim 11, wherein the filter device comprises a filter housing, a filter frame, and a second filter connected to a side wall of the filter frame; wherein a lower end of the filter housing is provided with a third opening, a lower end of the second filter is provided with a fourth opening, and a lower end of the filter frame is provided with a fifth opening;

the side wall of the filter frame is provided with a filter gap; and the filter frame is at least partially located in the filter housing.

14. The underwater debris suction apparatus according to claim 13, wherein the filter frame is detachably connected to the filter housing or the filter frame is detachably connected to the collection device, and the lower end of the filter housing is connected to the collection device.

15. The underwater debris suction apparatus according to claim 2, wherein the power device further comprises a power positioning member;

the suction component is connected to the power positioning member and the suction component rotates relative to the power positioning member; and the power positioning member is connected to the filter device or/and the collection device.

16. The underwater debris suction apparatus according to claim 3, wherein the power device further comprises a power positioning member;

the suction component is connected to the power positioning member and the suction component rotates relative to the power positioning member; and the power positioning member is connected to the filter device or/and the collection device.

17. The underwater debris suction apparatus according to claim 11, wherein the power device further comprises a power positioning member;

the suction component is connected to the power positioning member and the suction component rotates relative to the power positioning member; and the power positioning member is connected to the filter device or/and the collection device.

18. The underwater debris suction apparatus according to claim 2, wherein the outlet of the water inlet channel is flush with a lower end of the filter device or the outlet of the water inlet channel is located in the filter device.

19. The underwater debris suction apparatus according to claim 4, wherein the lower end of the filter housing and the collection device are detachably connected or fixedly connected or integrally formed.

20. The underwater debris suction apparatus according to claim 6, wherein the lower end of the filter housing and the collection device are detachably connected or fixedly connected or integrally formed.

* * * * *